United States Patent
Lenarduzzi et al.

(10) Patent No.: US 7,356,385 B2
(45) Date of Patent: Apr. 8, 2008

(54) END-USER ELECTRICAL LOAD CONTROLLER

(76) Inventors: Frank Lenarduzzi, 1495 Stoneybrook Trail, Oakville, Ontario (CA) L6M 2P7; Marc Delisle, 2433 Stefi Trail, Oakville, Ontario (CA) L6H 5Y4; Tom Gough, 36 Meadowvale Drive, Etobicoke, Ontario (CA) M8Y 2N9

( * ) Notice: Subject to any disclaimer, the term of this patent is extended or adjusted under 35 U.S.C. 154(b) by 0 days.

(21) Appl. No.: 11/356,955

(22) Filed: Feb. 21, 2006

(65) Prior Publication Data

US 2006/0195230 A1   Aug. 31, 2006

(30) Foreign Application Priority Data

Feb. 28, 2005  (CA) .................................... 2498686

(51) Int. Cl.
*G05D 11/00*   (2006.01)
*G05B 23/02*   (2006.01)

(52) U.S. Cl. ..................... 700/295; 340/3.31; 307/308; 705/412

(58) Field of Classification Search ................ 700/292, 700/295; 340/3.31; 307/11, 38; 165/238; 705/412

See application file for complete search history.

(56) References Cited

U.S. PATENT DOCUMENTS

| | | | |
|---|---|---|---|
| 4,317,049 A | | 2/1982 | Schweppe |
| 4,385,241 A | | 5/1983 | Peddie et al. |
| 5,576,700 A | * | 11/1996 | Davis et al. ............... 340/3.31 |
| 5,861,683 A | * | 1/1999 | Engel et al. .................. 307/38 |
| 5,924,486 A | * | 7/1999 | Ehlers et al. ............... 165/238 |
| 6,167,389 A | * | 12/2000 | Davis et al. ................ 705/412 |
| 6,314,378 B1 | | 11/2001 | Hodge et al. |
| 2004/0174071 A1 | * | 9/2004 | Nierlich et al. ............... 307/11 |

* cited by examiner

*Primary Examiner*—Leo Picard
*Assistant Examiner*—Sheela Rao

(57) ABSTRACT

An end-user load controller that can be used in an electrical energy supply system for controlling electrical energy to an end-user load is disclosed. The controller periodically evaluates whether the load should be on or off based on comparisons of load-operating information and system emergency information to predetermined criteria which is provided to the controller from time to time. The load is switched on or off depending upon the load-operating information as compared to the predetermine criteria. Also, the load is switched off depending on the system emergency information as compared to the predetermined criteria, regardless of the load-operating information.

15 Claims, 2 Drawing Sheets

END-USER ELECTRICAL LOAD CONTROLLER

FIELD OF THE INVENTION

This invention relates to an end-user electrical load controller that can be used in an electrical energy supply system for controlling electrical energy to an end-user load.

BACKGROUND OF THE INVENTION

Electrical energy is typically generated and distributed through large electric energy supply systems and then consumed by many end-user loads. In the past, there have been some different types of methods to control the electrical loads of those systems. However, most of these methods and devices relate to control in the distribution part of the system, and not at the customer or end-user locations, such as residences or businesses.

There have been some attempts to control electric energy to user loads. However, those attempts have not been wholly successful and have their limitations. For example, U.S. Pat. No. 4,317,049 to Scheppe discloses a power-energy rescheduler for controlling transfer of electric energy to user load units based on both the customer's needs and the needs of the overall electric power system as determined by the relationship of the frequency measured at or near the load unit to a nominal, possibly time-varying, frequency.

Also, U.S. Pat. No. 4,385,241 to Peddie et al. discloses a method of safeguarding an A.C. electric power system against the effects of the power demand on the system exceeding the generating capacity comprising the steps of, for each of a plurality of consumers, sensing when the power supply frequency falls below a predetermined frequency and interrupting the power supply to at least part of the load taken by each of the consumers in response to a sensed fall of frequency to below the predetermined frequency.

Also, U.S. Pat. No. 6,314,378 to Hodge et al. discloses a method of locating programmable frequency sensitive relays at lead shedding points within an electricity supply network, wherein each said relay controls one or more loads connected to the network and contains programmable disconnect and reconnect conditions such that one or more of said loads are disconnected from the said network upon said relay detecting said programmable disconnect conditions on the network.

SUMMARY OF THE INVENTION

Accordingly, it is an object of this invention to at least partially overcome the disadvantages of the prior art. Also, it is an object of this invention to provide an improved type of end-user electrical load controller for controlling electrical energy to an end-user load.

Accordingly, in one of its aspects, this invention resides in providing an end-user load controller for controlling electrical energy from an electrical supply system to load of an end user, comprising: a receiver to receive load-operating information; a monitor to monitor system emergency information; predetermined criteria; an evaluator to periodically evaluate whether the load should be on or off, based on comparisons of the load-operating information and the system emergency information to the predetermined criteria; a switch to turn the load on or off depending on a most-recent evaluation by the evaluator; wherein the load is switched on or off depending upon the load-operating information as compared to the predetermined criteria; and wherein the load is switched off depending on the system emergency information as compared to the predetermined criteria, regardless of the load-operating information.

Accordingly, in a further one of its aspects, this invention resides in providing an end-user load controller for controlling electrical energy from an electrical supply system to a load of an end user, comprising: a receiver to receive load-operating information, wherein the load-operating information is at least one selected from the group comprising:

(a) time of day;
(b) whether the load is on, that is consuming electrical energy, or off, that is not consuming electrical energy;
(c) the total amount of energy being consumed by the load;
(d) one or more prices of electrical energy to the load;
(e) other information which might reasonably affect whether the load should be on or off from the end user's point of view;

a monitor to monitor system emergency information, wherein the system emergency information is at least one selected from the group comprising:

(a) a system control signal that the load may be on;
(b) a system control signal that the load must be off;
(c) a system control signal that reduced system load is desired; and
(d) frequency of electrical current delivered to the load;
(e) voltage across the load;
(f) rate of change of frequency of electrical current delivered to the load;
(g) rate of change of voltage across the load;
(h) local brown-out conditions exist;
(i) local adverse weather conditions exist;
(j) a system control signal that the load must be off; and
(k) other information which might reasonably affect whether the load should be off from a point of view of the electrical supply system;

predetermined criteria, wherein the predetermined criteria are selected from the group comprising:

(a) the load may be on at first predetermined times of day;
(b) the load must be off at second predetermined times of day;
(c) the load may be on when the price of electrical energy is at or below a first predetermined price;
(d) the load must be off when the price of electrical energy is at or above a second predetermined price;
(e) the total amount of energy being consumed by the load may not exceed a predetermined amount when the price of electrical energy is at or above a third predetermined price;
(f) the load may be switched off if reduced system load is desired;
(g) the load must be off when the frequency of electrical current delivered to the load is at or below a first predetermined frequency;
(h) the load must be off when the voltage across the load is at or below a predetermined value;
(i) the load must be off when the rate of change of the frequency of electrical current delivered to the load is at or above a predetermined value;
(j) the load must be off when the rate of change of the voltage across the load is at or above a predetermined value;
(k) the load must be off when local brown-out conditions of a predetermined value exist;
(l) the load must be off when predetermined local adverse weather conditions exist;

(m) the load must be off when total system energy demand is at or exceeds a predetermined value; and (n) other relevant predetermined values;

an evaluator to periodically evaluate whether the load should be on or off, based on comparisons of the load-operating information and the system emergency information to the predetermined criteria; a switch to turn the load on or off depending on a most-recent evaluation by the evaluator; wherein the load is switched on or off depending upon the load-operating information as compared to the predetermined criteria; and wherein the load is switched off depending on the system emergency information as compared to the predetermined criteria, regardless of the load-operating information.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
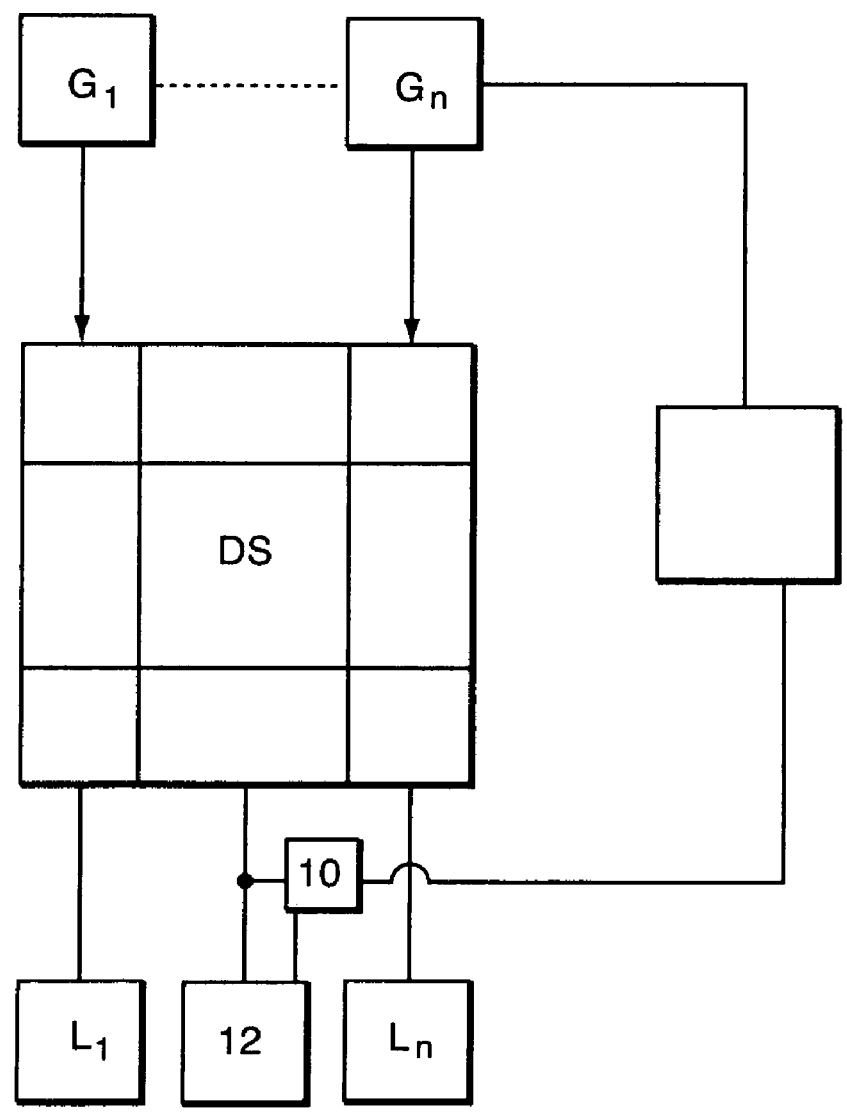
FIG. 1 is a schematic drawing of an electrical electric energy supply system in which the controller of the present invention may be used.

In electrical energy supply systems there are typically a plurality of generators $G_1$ to $G_n$ as shown schematically in FIG. 1. The electrical generators $G_n$ generate electrical energy which is distributed through a distribution system DS to a plurality of end-user loads $L_1$ to $L_n$.

The amount of electrical energy generated by the generators $G_n$ must correspond to the amount of electrical energy consumed by end-user loads $L_n$. There is a need to control the amount of electrical energy consumed by the entire electrical system and there is also a need to control the amount of electrical energy consumed by any individual end-user load.

In one preferred embodiment of the invention as shown in FIG. 1 there is an end-user load controller 10 for controlling electrical energy from an electrical supply system to a load 12 of an end user. The controller 10 periodically evaluates whether the end-user load 12 should be on, that is consuming electrical energy, or off, that is not consuming electrical energy, based on comparisons of load-operating information and system emergency information to predetermined criteria which is placed into the controller 10 from time to time. The load 12 is switched on or off (which includes maintaining the load 12 on or off) depending upon the load-operating information as compared to the predetermined criteria. Also, the load 12 is switched off depending on the system emergency information as compared to the predetermined criteria, regardless of the load-operating information. In other words, in emergency situations, the load is shut off regardless of other factors.

Figure 2:
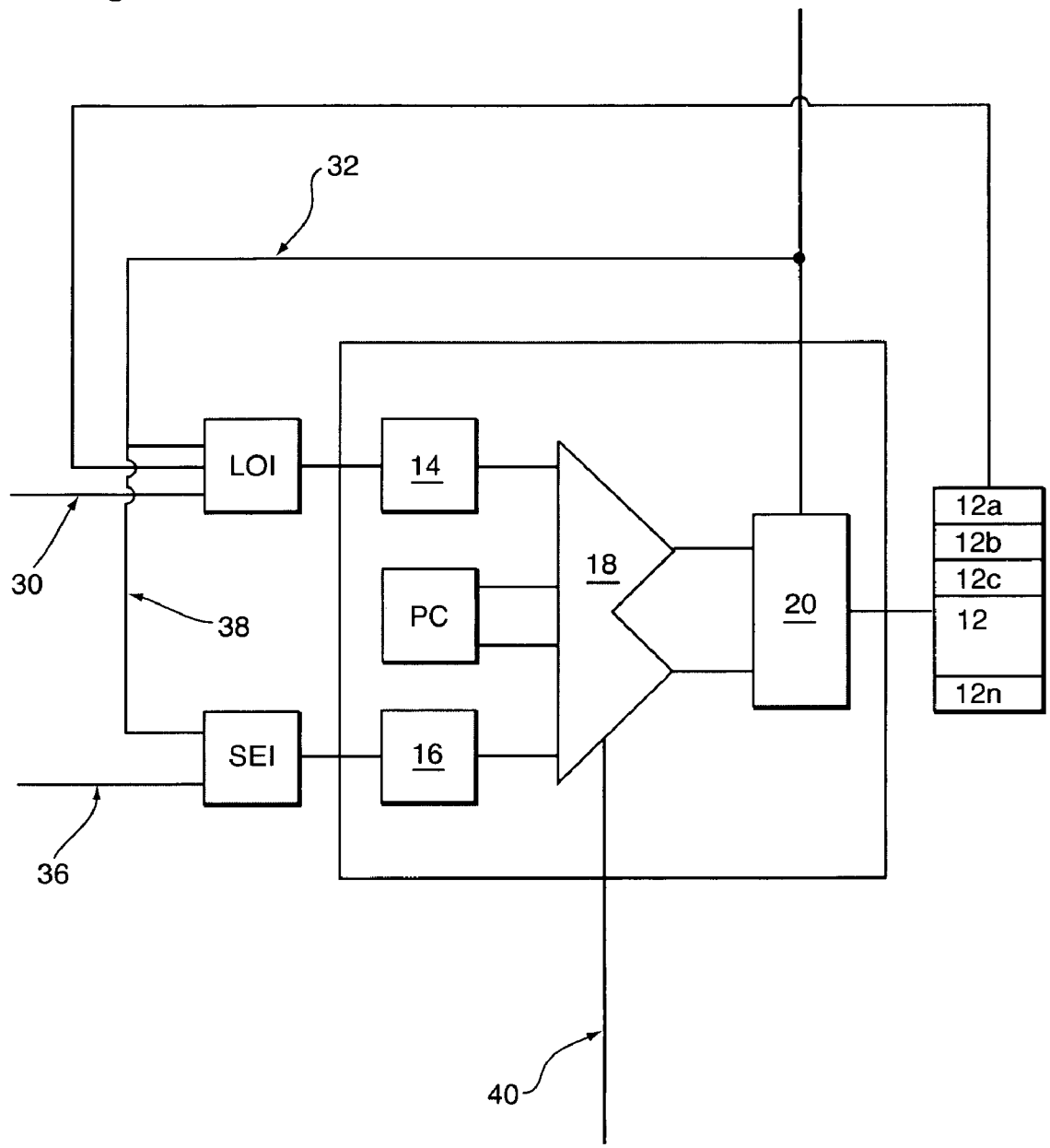
FIG. 2 is a schematic diagram illustrating elements of a preferred embodiment of the invention.

The end-user load controller 10 comprises a receiver 14 to receive load-operating information (shown schematically as "LOI" in FIG. 2). Load-operating information is information relating to the load or which might reasonably affect whether the load should be on or off from the particular end user's point of view. Preferably, the load-operating information may be any of the following:

(a) time of day;

(b) whether load is on, that is consuming electrical energy, or off, that is not consuming electrical energy;

(c) the total amount of energy being consumed by the load;

(d) one or more prices of electrical energy to the load; and (e) other information which might reasonably affect whether the load should be on or off from the end user's point of view.

The end-user load controller 10 also comprises a monitor 16 to monitor system emergency information (shown schematically as "SEI" in FIG. 2). System emergency information is information which might reasonably affect whether the load should be off from the point of view of the electrical supply system. Preferably, system emergency information may be any of the following:

(a) a system control signal that the load may be on;

(b) a system control signal that the load must be off;

(c) a system control signal that reduced that system load is desired; and (d) frequency of electrical current delivered to the load;

(e) voltage across the load;

(f) rate of change of frequency of electrical current delivered to the load;

(g) rate of change of voltage across the load;

(h) local brown-out conditions exist;

(i) local adverse weather conditions exist;

(j) a system control signal that the load must be off; and (k) other information which might reasonably affect whether the load should be off from a point of view of the electrical supply system.

Predetermined criteria (shown schematically as "PC" in FIG. 2) are provided to the controller 10. The predetermined criteria are criteria or information against which the load-operating information or the system emergency information are to be compared as discussed below. Preferably, the predetermined criteria may be any of the following:

(a) the load may be on at first predetermined times of day;

(b) the load must be off at second predetermined times of day;

(c) the load may be on when the price of electrical energy is at or below a first predetermined price;

(d) the load must be off when the price of electrical energy is at or above a second predetermined price;

(e) the total amount of energy being consumed by the load may not exceed a predetermined amount when the price of electrical energy is at or above a third predetermined price;

(f) the load may be switched off if reduced system load is desired;

(g) the load must be off when the frequency of electrical current delivered to the load is at or below a first predetermined frequency;

(h) the load must be off when the voltage across the load is at or below a predetermined value;

(i) the load must be off when the rate of change of the frequency of electrical current delivered to the load is at or above a predetermined value;

(j) the load must be off when the rate of change of the voltage across the load is at or above a predetermined value;

(k) the load must be off when local brown-out conditions of a predetermined value exist;

(l) the load must be off when predetermined local adverse weather conditions exist;

(m) the load must be off when total system energy demand is at or exceeds a predetermined value; and (n) other relevant predetermined values.

An evaluator 18 periodically evaluates whether the load 12 should be on or off. These evaluations are based on comparisons of the load-operating information to the relevant predetermined criteria and comparisons of the system emergency information to the relevant predetermined criteria.

Depending on the most-recent evaluation by the evaluator 18, a switch 20 turns the load 12 on or off (which includes maintaining the load 12 on or off).

Specifically, the load 12 is switched on or off depending upon the load-operating information as compared to the relevant predetermined criteria. Also, the load 12 is switched off depending on the system emergency information as compared to the predetermined criteria, regardless of the load-operating information.

For example, in one preferred embodiment, the receiver 14 receives load-operating information as to the time of day and the price of electrical energy to the load 12. In this preferred embodiment, the controller 10 has been provided with the predetermined criterion that the load may be on at first predetermined times of day (say 1:00 a.m. to 7:00 a.m.), but the load 12 must be off at second predetermined times of day corresponding to peak demand periods (say 4:00 p.m. to 6:00 p.m.).

Thus, the receiver 14 receives the load-operating information comprising the time of day and the evaluator 18 periodically compares the time of day to the predetermined time of day when the load may by on and the predetermined times of day when the load must be off. If the load-operating information received by the receiver 14 indicates that the time of day corresponds to the second predetermined times of day when the load must be off, the switch 20 is activated to switch the load 12 off.

In another example, the load 12 must be off when the price of electrical energy is at or above a predetermined price (say 5.0 cents per kilowatt hour for a given quantity). Thus, if the evaluator 18 evaluates that the actual price of electrical energy to the load as received by the receiver 14 is at or above the predetermined price when the load must be off, the switch 20 is activated to turn the load 12 off. Similarly, if the evaluator 18 evaluates that the actual price of electrical energy to the load as received by the receiver 14 is below the predetermined price when the load must be off and at or below the first predetermined price when the load may be on, the switch 20 is activated to turn the load 12 on.

In another example of a further preferred embodiment, if the monitor 16 monitoring system emergency information monitors the frequency of electrical current delivered to the load 12 and one of the predetermined criteria provided to the receiver 10 is that the load 12 must be off when the frequency of electrical current delivered to the load is at or below a predetermined frequency, such as 58.8 Hertz, the switch 20 will be activated to turn the load 12 off, regardless of the load-operating information and how the load-operating information compares to the relevant predetermined criteria.

For example, if comparisons between the load-operating information and the relevant predetermined criteria for comparison to load-operating information are evaluated such that the load 12 may be turned on, but the frequency of electrical current delivered to the load is at or below the first predetermined frequency, the switch 20 will be activated to turn the load 12 off regardless of those other factors.

The receiver 14 may receive one or more of the pieces of load-operating information identified above. Similarly, the monitor 16 may monitor one or more of the pieces of system emergency information as identified above.

In a preferred embodiment, the controller 10 receives at least some of the load-operating information from at least one communications path. Preferably, the communications path is the Internet 30 or a power line carrier 32. There may be more than one communications path to the receiver 14 wherein some of the load-operating information is received on one communications path 30 and other of the load-operating information is received on one or more other communications paths 32 and 34.

Also, some of the load-operating information may come from the load 12 itself through a suitable communication path 34.

Similarly, the controller 10 receives or monitors at least some of the system emergency information from or through at least one communications path. Preferably the communications paths are the Internet 36 or a power line carrier 38. There may be more than one communications path from or through which the monitor 16 monitors system emergency information. Thus, for example, some of the system emergency information may be monitored from or through the Internet 36 and other of the system emergency information may be monitored through or-over a power line carrier 38.

In a preferred embodiment, the end-user load 12 is comprised of a plurality of individual loads 12a to 12n, such as would be found in a residence or commercial or industrial enterprise. For example, the individual loads 12a to 12n could be any of a water heater, a stove, an oven or electric dryer and the like.

In such an embodiment, it is preferred that at least one of, (for example individual load 12b) and preferably more than one of (for example individual loads 12b and 12c), the individual loads 12a to 12n has individual predetermined criteria, individual load-operating information and individual system emergency information. The individual predetermined criteria, individual load-operating information and individual system emergency information are the same as the predetermined criteria, load-operating information and system emergency information identified previously.

Moreover, the evaluator 18 periodically evaluates whether the individual loads (for example 12b and 12c) should be on or off, based on comparisons of individual load-operating information for the individual load to the individual predetermined criteria for that individual load, and also based on comparisons of the individual system emergency information for that individual load to the individual predetermined criteria of that individual load.

Preferably, the switch 20 is a relay.

Preferably, the predetermined criteria may be changed from time to time. Thus, for example, if the prices of electrical energy to the load have generally increased or decreased over a period of time, for example the last week, the end-user may wish to change the predetermined criteria relating to the prices of electrical energy at which the load 12 may be on and the load 12 must be off.

Similarly, in a further preferred embodiment of the invention, the individual predetermined criteria of the individual loads 12a to 12n may be changed from time to time.

In a further preferred embodiment of the invention, the controller 10 has an override mode where the load 12, or one or more individual loads (for example load 12b), must be off regardless of load-operating information.

In a further preferred embodiment of the invention, the controller 10 includes a suitable under frequency load shedding device which shuts off the load 12 based upon the frequency of the electric current delivered to the load 12, or to the individual loads, and wherein the trigger frequency for shedding the load, or the individual loads, is set by a system control signal 40.

A system control signal is provided by an authority of the electrical supply system.

Preferably the controller 10 is installed in the vicinity of or in close physical proximity to the load 12.

Preferably the end user with respect to the load 12 is an individual's residence or a business enterprise. In those situations, preferably the controller 10 is installed in the individual's residence or on the business premises.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. An end-user load controller for controlling electrical energy from an electrical supply system to a load of an end user, comprising:
    a receiver to receive load-operating information, wherein the load-operating information is at least one selected from the group comprising:
    (a) time of day;
    (b) whether the load is on, that is consuming energy, or off, that is not consuming electrical energy;
    (c) the total amount of energy being consumed by the load;
    (d) one or more prices of electrical energy to the load;
    (e) other information which might reasonably affect whether the load should be on or off from the end user's point of view;
    a monitor to monitor system emergency information, wherein the system emergency information is at least one selected from the group comprising:
    (a) a system control signal that the load may be on;
    (b) a system control signal that the load must be off
    (c) a system control signal that reduced system load is desired; and
    (d) frequency of electrical current delivered to the load;
    (e) voltage across the load;
    (f) rate of change of frequency of electrical current delivered to the load;
    (g) rate of change of voltage across the load;
    (h) local brown-out conditions exist;
    (i) local adverse weather conditions exist; and
    (j) other information which might reasonably affect whether the load should be off from a point of view of the electrical supply system;
    predetermined criteria, wherein the predetermined criteria are selected from the group comprising:
    (a) the load may be on at first predetermined times of day;
    (b) the load must be off at second predetermined times of day;
    (c) the load may be on when the price of electrical energy is at or below a first predetermined price;
    (d) the load must be off when the price of electrical energy is at or above a second predetermined price;
    (e) the total amount of energy being consumed by the load may not exceed a predetermined amount when the price of electrical energy is at or above a third predetermined price;
    (f) the load may be switched off if reduced system load is desired;
    (g) the load must be off when the frequency of electrical current delivered to the load is at or below a first predetermined frequency;
    (h) the load must be off when the voltage across the load is at or below a predetermined value;
    (i) the load must be off when the rate of change of the frequency of electrical current delivered to the load is at or above a predetermined value;
    (j) the load must be off when the rate of change of the voltage across the load is at or above a predetermined value;
    (k) the load must be off when local brown-out conditions of a predetermined value exist;
    (l) the load must be off when predetermined local adverse weather conditions exist;
    (m) the load must be off when total system energy demand is at or exceeds a predetermined value; and
    (n) other relevant predetermined values;
    an evaluator to periodically evaluate whether the load should be on or off, based on comparisons of the load-operating information and the system emergency information to the predetermined criteria;
    a switch to turn the load on or off depending on a most-recent evaluation by the evaluator;
    wherein the load is switched on or off depending upon the load-operating information as compared to the predetermined criteria; and
    wherein the load is switched off depending on the system emergency information as compared to the predetermined criteria, regardless of the load-operating information.

2. A controller as defined in claim 1 wherein the controller receives at least some of the load-operating information from at least one communications path.

3. A controller as defined in claim 2 wherein the at least one communications path is the Internet.

4. A controller as defined in claim 2 wherein the at least one communications path is a powerline carrier.

5. A controller as defined in claim 1 wherein the controller receives at least some of the system emergency information from at least one communications path.

6. A controller as defined in claim 5 wherein the at least one communications path is the Internet.

7. A controller as defined in claim 6 wherein the controller also receives at least some of the load-operating information from the Internet.

8. A controller as defined in claim 7 wherein the load is comprised of a plurality of individual loads.

9. A controller as defined in claim 8 wherein at least one of the individual loads has individual predetermined criteria, individual load-operating information and individual system emergency information, and the evaluator, periodically evaluates whether the at least one of the individual loads should be on or off, based on comparisons of load-operating information and system emergency information of the at least one of the individual loads to the predetermined criteria of the at least one of the individual loads.

10. A controller as defined in claim 9 wherein the switch is a relay.

11. A controller as defined in claim 10 wherein any of the predetermined criteria may be changed from time to time.

12. A controller as defined in claim 11 wherein any of the individual predetermined criteria may be changed from time to time.

13. A controller as defined in claim 12 wherein the controller has an override mode where the load must be off regardless of load-operating information.

14. A controller as defined in claim 13 wherein the controller includes an under frequency load shedding device which shuts off the load based upon the frequency of electric current delivered to the load and wherein the trigger frequency for shedding the load is set by a system control signal.

15. A controller as defined in claim 5 wherein the at least one communications path is a powerline carrier.

* * * * *